United States Patent [19]

Kem et al.

[11] Patent Number: 5,058,141
[45] Date of Patent: Oct. 15, 1991

[54] SINGLE CIRCUIT FOR DETECTING A FRAME SYNCHRONIZATION PATTERN AND GENERATING CONTROL SIGNALS

[75] Inventors: Han Kem, Glendale; John S. Young, Scottsdale, both of Ariz.

[73] Assignee: AG Communication Systems Corporation, Phoenix, Ariz.

[21] Appl. No.: 486,680

[22] Filed: Mar. 1, 1990

[51] Int. Cl.[5] .............................................. H04L 7/04
[52] U.S. Cl. .................................. 375/116; 370/105.4
[58] Field of Search ...................... 375/114, 116, 118; 370/105.4, 108; 364/715.11

[56] References Cited

U.S. PATENT DOCUMENTS

| | | | |
|---|---|---|---|
| 4,607,378 | 8/1986 | Catlin et al. | 375/116 |
| 4,740,962 | 4/1988 | Kish, III | 375/116 |
| 4,787,095 | 11/1988 | Forth et al. | 375/114 |
| 4,794,626 | 12/1988 | Tanabe et al. | 375/116 |

Primary Examiner—Benedict V. Safourek
Attorney, Agent, or Firm—Anthony J. Baca

[57] ABSTRACT

A single circuit for detecting a synchronization pattern in a serial data stream. Subsequent to detecting the synchronization pattern, the single circuit generates the control signals for converting the serial data to a parallel format and loading the parallel data into a first-in-first-out (FIFO) memory. The single circuit includes a controller arranged to receive the serial data stream. A counter is connected to the controller. When the counter is detecting the synchronization pattern and the synchronization pattern is being received, the counter is incremented. Absent the synchronization pattern being received, the counter is reset to a predetermined starting point. Subsequent to detecting the synchronization pattern, the counter generates a load signal. The single circuit further includes a pulse generator arranged to receive the load signal from the counter and generate a pulse of duration equal to a bit period of the serial data stream. An indicator is provided which generates an in-synch signal after the counter detects the synchronization pattern.

11 Claims, 5 Drawing Sheets

SINGLE CIRCUIT FOR DETECTING A FRAME SYNCHRONIZATION PATTERN AND GENERATING CONTROL SIGNALS

FIELD OF THE INVENTION

The present invention relates in general to digital circuits. More particularly, to a circuit for detecting a serial frame synchronization pattern, and subsequently generating control signals for converting the serial data to a parallel format and loading the parallel data into a first-in-first-out (FIFO) memory. This single circuit performs both functions: a frame sync detector and a control generator, thereby, significantly reducing the number of components and cost.

BACKGROUND OF THE INVENTION

When data is transferred at high speeds, it is generally in a synchronous format. Additional, to reduce the number of interconnects, the data is sent as serial data. Simple systems precede every data byte with a start bit and add a stop bit to the end of every data byte, just as in asynchronous systems. Based on eight-bit data, this represents a 20% reduction in through-put.

More sophisticated protocols are used to increase the overall through-put of data. To reduce the number of extra bits added to the data stream, the data is placed into packets (blocks) of data. Prior to sending a packet (or packets), a unique start pattern-more commonly called a frame synchronization pattern-is sent. The receiver must wait until the start pattern is detected. Upon detection of the start pattern, the next bit received is part of the data, which is clocked into a serial-to-parallel converter. After a predetermined number of data bits are clocked into the serial-to-parallel converter, the parallel data is clocked out to make room for the next data bit being received. Generally the parallel data is clocked into a FIFO so the receiver is not interrupted every time a data byte is received.

Prior to the present invention, serial frame sync detection and clock generation was accomplished by separate frame detection and clock generation circuits. Such frame detection circuit consisted of a serial-to-parallel converter, a comparator, and an indicator latch. The output of the serial-to-parallel converter was compared to a known frame sync pattern. Upon detection of the frame pattern, the frame detector enabled a clock divider circuit that generated the control signals which clocked the serial-to-parallel converter and loaded the data into the FIFO. Also, when the frame sync pattern was detected the indicator latch was set.

The present invention uses a single circuit approach, which significantly reduces the number of components required to perform frame detection and control signal generation. Another advantage of the present invention is that it can be easily adapted to perform either, or both, of these functions. The present invention can be tailored to work with either continuous or discontinuous (Time Division Multiplexed TDM) types of serial data streams.

SUMMARY OF THE INVENTION

In order to accomplish the object of the present invention there is provided a single circuit for detecting a synchronization pattern in a serial data stream. Subsequent to detecting the synchronization pattern, the single circuit generates a plurality of signals.

The single circuit includes a controller arranged to receive the serial data stream. A counter is connected to the controller, the counter detects the synchronization pattern. Subsequent to detecting the synchronization pattern, the counter generates a load signal.

The single circuit further includes a pulse generator arranged to receive the load signal from the counter and generate a pulse of duration equal to a bit period of the serial data stream. An indicator is provided which generates an in-synch signal after the counter detects the synchronization pattern.

The controller also receives an enable signal, in the absence of the enable signal, the controller inhibits the counter from detecting the synchronization pattern or generating the load signal. The controller is further arranged to generate a shift clock signal, wherein the shift clock signal has a frequency equal to the bit rate of the serial data stream. The controller only generates the shift clock signal when the controller receives the enable signal.

The counter receives the shift clock signal. When the counter is detecting the synchronization pattern and the synchronization pattern is being received, the counter is incremented by the shift clock signal. Absent the synchronization pattern being received, the counter is reset to a predetermined starting point. When the counter is generating the load signal, the shift clock signal is divided by a predetermined number to create the load signal.

DESCRIPTION OF THE DRAWINGS

A better understanding of the invention may be had from the consideration of the following detailed description taken in conjunction with the accompanying drawings, in which.

DESCRIPTION OF THE PREFERRED EMBODIMENT

First an overall description of the operation of the present invention will be given, followed by a more detailed description. Finally, a short discussion on some of the changes that may be necessary for alternative implementations.

Figure 1:
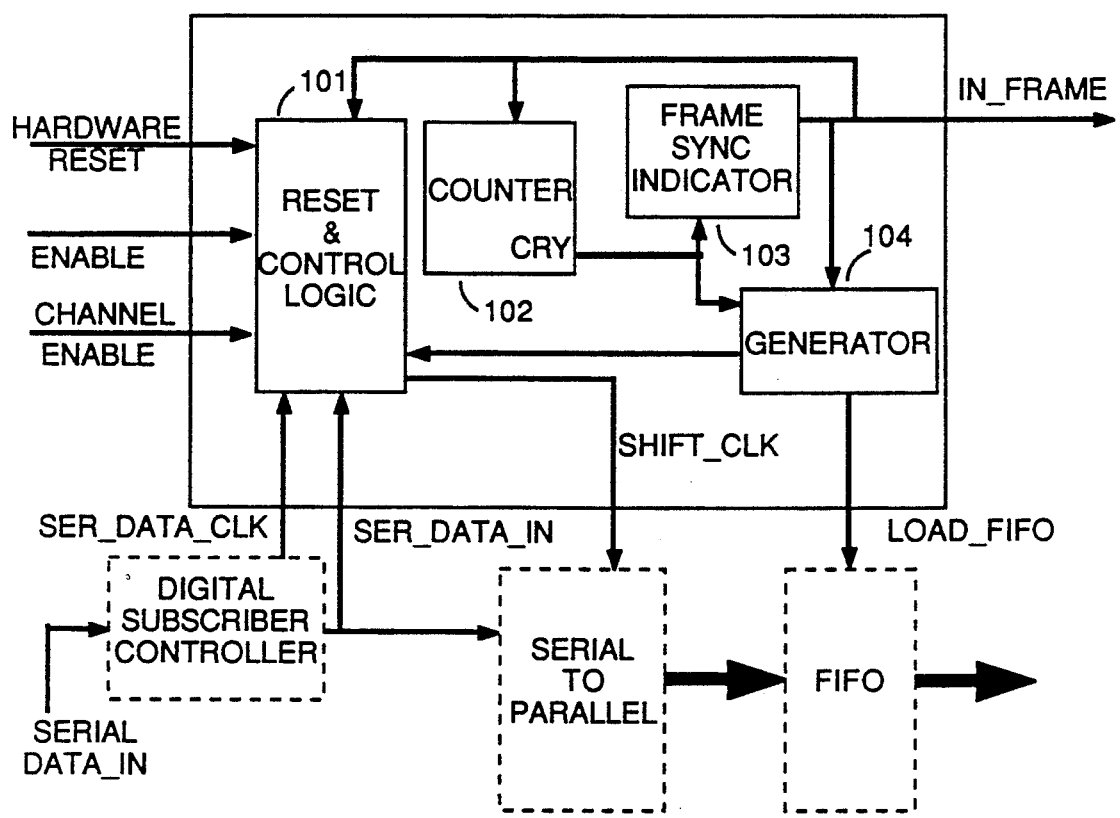
FIG. 1 is a block diagram of the interface circuit. The dashed boxes are external devices, and will not be described.

As shown in FIG. 1, the present invention consists of: a reset and control logic 101, a counter 102, a frame synchronization detection indicator 103, and a pulse generator 104. The function of the circuit is to first detect the serial frame synchronization pattern (eight consecutive logic zeros), and then generate the proper control signals to load the frame sync and subsequent data into the FIFO.

The SER_DATA_IN input receives the serial data and the SER_DATA_CLK input receives a clock signal which defines the serial data bit boundaries. The CHANNEL_ENABLE signifies when the serial data is valid. The ENABLE input resets the circuit to a frame synchronization detector. The rising edge of IN_FRAME indicates that the frame synchronization pattern has just been detected. The signal SHIFT_CLK clocks the serial-to-parallel converter, and LOAD_IN_FIFO controls when the parallel data is loaded into the FIFO.

When reset and control logic 101 is enabled (ENABLE=1), it begins sampling the serial input data. If the serial input data is a logic one (not a frame sync pattern), counter 102 is reloaded to its initial value of 07. If the serial input data is a logic zero, counter 102 is incremented by one. The eighth consecutive zero sampled increments counter 102 to 15 which forces CRY to a logic one. The signal CRY triggers the frame sync indicator circuit 103 signaling that a frame sync pattern has been detected.

Until the circuit is reset, control logic 101 stops sampling the data, counter 102 is reloaded with a new value of 08, and its function changes to a clock divider. Counter 102 divides SHIFT_CLK by eight, by counting from eight to fifteen, effectively producing a clock whose frequency equals one eighth that of SHIFT_CLK. Pulse generator circuit 104 takes this clock signal and gates it with SHIFT_CLK and CHANNEL_ENABLE to generate a LOAD_IN FIFO clock pulse. The signal LOAD_IN_FIFO controls the loading of parallel data into the FIFO.

With the aid of FIGS. 2, 3, 4 and 5, a detailed description of the operation of the present invention will begin. Elements 201-206 comprise the reset and control logic, element 207 is the counter, element 208 is the frame sync indicator, and elements 202, 207 and 209-210 comprise the pulse generator.

Initially, when disabled or after power up (ENABLE=0 or ~HDW_RESET=0), synchronous binary counter 207 and D-FF 208 are cleared and their outputs are at a logic zero. When enabled, the output of element 205 is at logic one and counter 207 and frame sync indicator 208 are enabled. When the input to element 201 (SER_DATA_IN) is a logic one, the output is a logic zero, as is the output of element 202. The output of element 202 reloads element 207 with 07 essentially initializing the counter to its starting value.

When the input to element 201 is a logic zero, its output is a logic one, as is the output of element 202. The output of element 202 allows the signal SHIFT_CLK to increment counter 207. If eight consecutive zeros are received at the input to element 201, counter 207 is incremented to 15, and its carry output (CRY) becomes a logic one. The rising edge of CRY triggers the frame sync indicator D-FF 208, setting the IN_FRAME signal to logic one. The IN FRAME signal stays high until it is reset or disabled. D-FF 208's output also changes counter 207's preset inputs from 07 to 08. At the same time, the complement of IN-FRAME, disables element 201 terminating the function of the circuit as a frame detector.

Counter 207 and element 209 now function as a free running divide-by-eight clock circuit. Counter 207 counts from 8 up to 15. At a count of 15 the CRY signal becomes a logic one. The output of element 209 is now a logic zero, causing the counter 207 to be reloaded (08) on the next rising edge of SHIFT_CLK.

Figure 4:
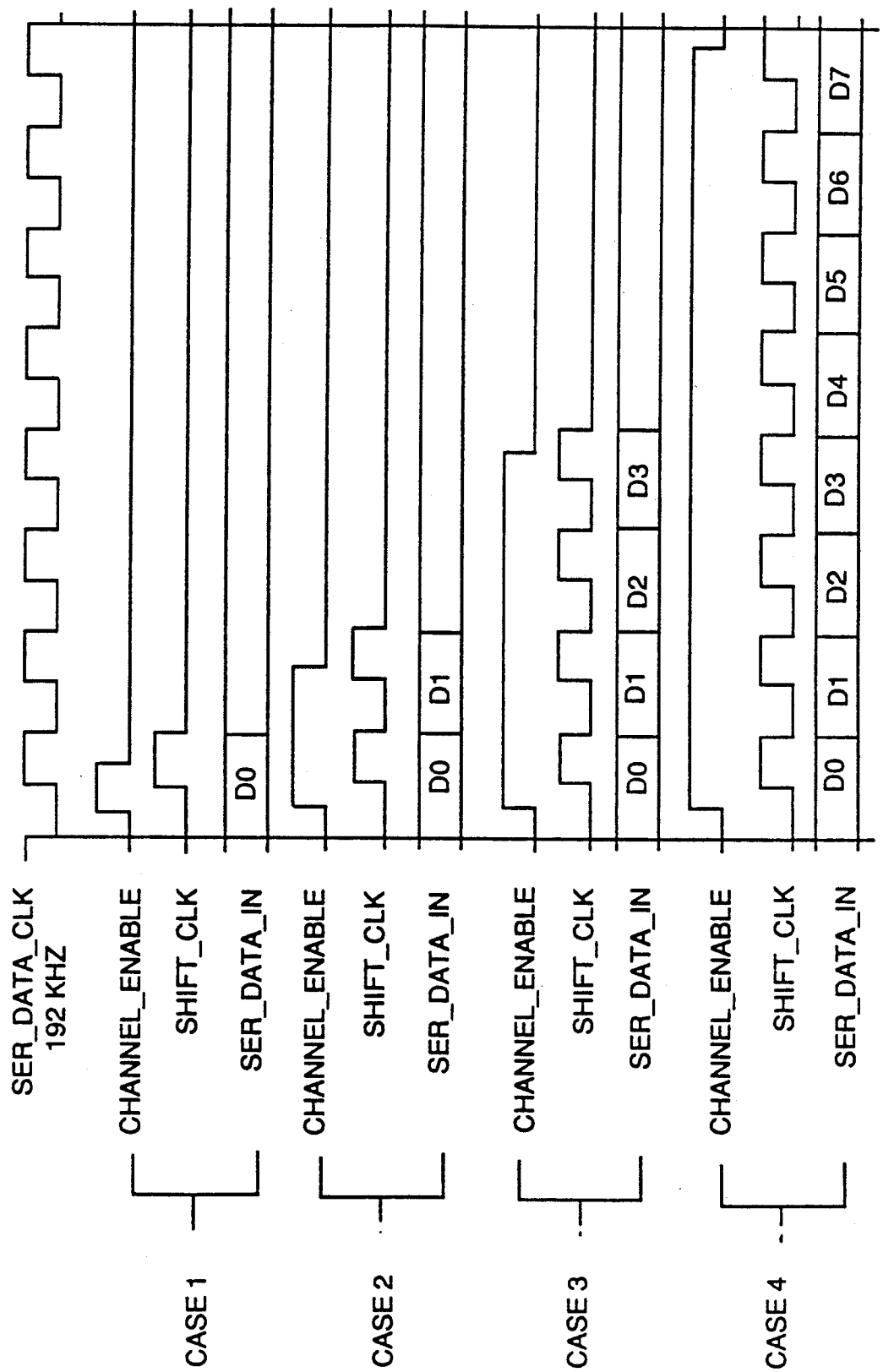
FIG. 4 is a timing diagram of the circuit in FIG. 2, showing serial input data and clocks at various possible programmable sub-rates of 8, 16, 32 and 64 kbps, within Bd-channel.
Figure 5:
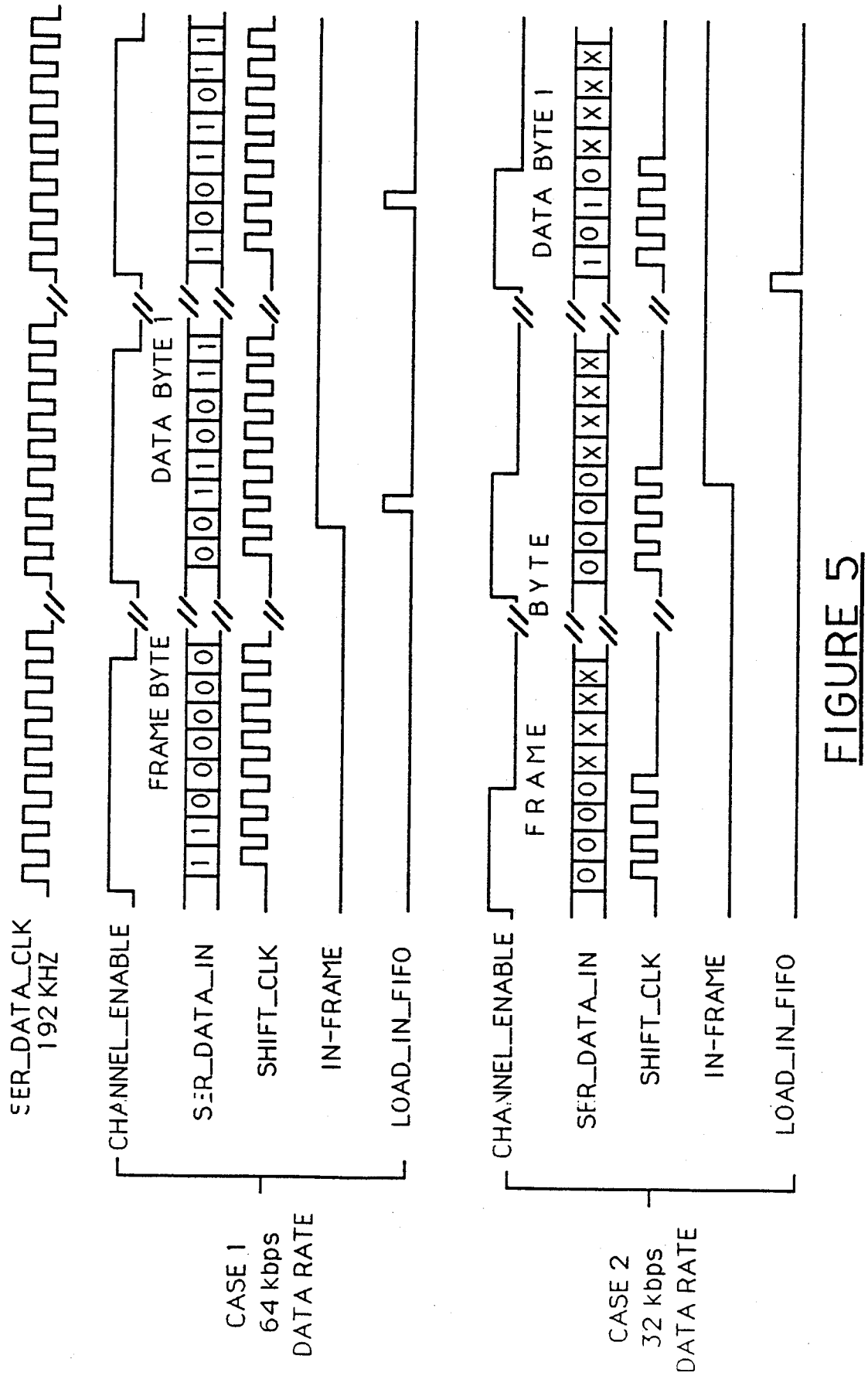
FIG. 5 is a timing diagram of the circuit in FIG. 2, showing two cases of serial-in data patterns, the shift clock, the time when the frame synchronization is found (IN_FRAME=1), and the generation of LOAD_IN_FIFO pulses.

Elements 207, 208 and 209, function as a pulse generator producing LOAD_IN_FIFO pulses as shown in FIG. 5. The logic one of IN_FRAME enables element 209, allowing the CRY of element 207 to pass through, which enables element 210, thereby generating a free running pulse train as shown in FIGS. 4 and 5. The pulse train synchronizes and directly controls when the parallel data is loaded into the FIFO.

The signal ENABLE, at the input of element 205, is a software reset which enables, and resets, the frame detector circuit. When ENABLE is a logic zero: the circuit is disabled, the serial input data stream will be ignored, counter 207 is reset, and no data is loaded into the FIFO. When the ENABLE signal returns to a logic one the outputs of element 206 and element 202 are logic zero, forcing counter 207 to be loaded with 07 by the next rising edge of SHIFT_CLK. The circuit is now in the frame synch detector mode and functions as described above. The other input to element 205 (~HDW_RESET) is a hardware reset that performs the same function.

Figure 2:
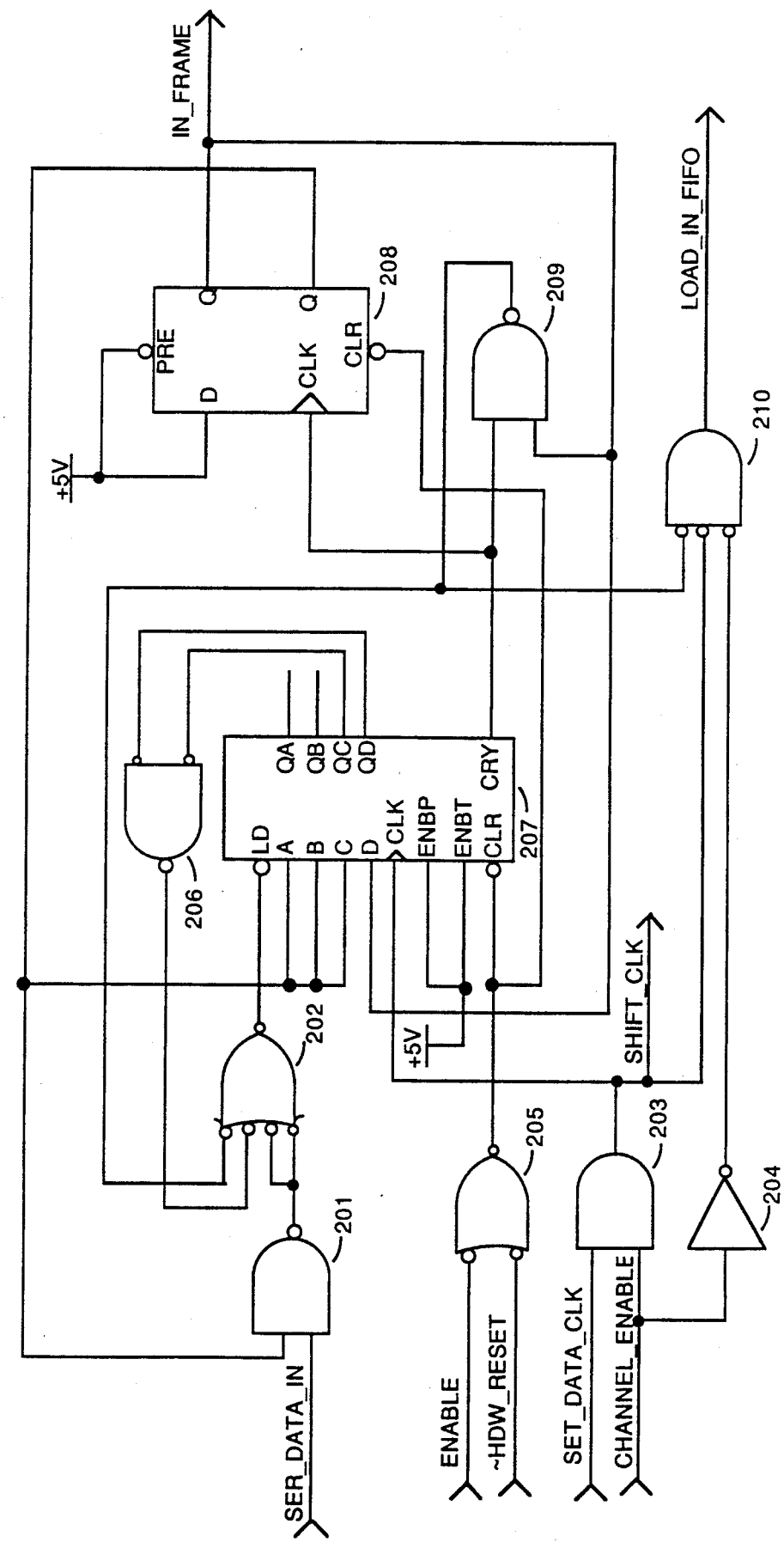
FIG. 2 is a detailed schematic diagram of the frame detector and control generator circuit, in accordance with the prevent invention.
Figure 3:
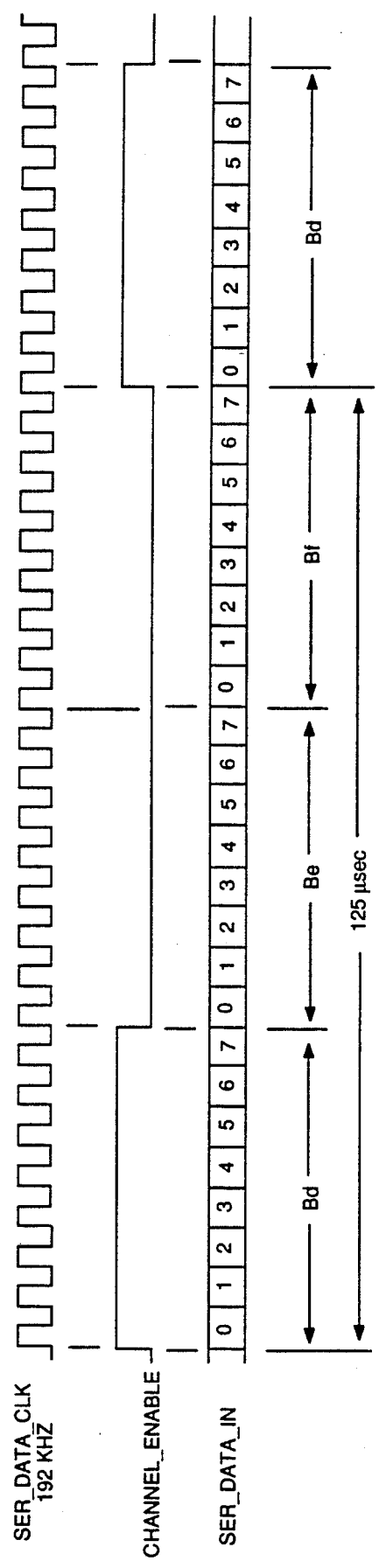
FIG. 3 is a timing diagram of the circuit in FIG. 2, showing a TDM serial data stream consisting of one 64 kbps channel (Bd-used for data in this invention) followed by two other 64 kbps channels (reserved for voice etc.)

Referring to FIG. 2, the signal CHANNEL_ENABLE at the input of element 203-204 is a programmable control input which, when a logic one, indicates a time slot where the serial data is valid. As shown in FIG. 4, this signal is externally programmable to different pulse width so as to allow an 8, 16, 32, or 64 kbps data rate. For example, at 8 kbps, the CHANNEL_ENABLE pulse width is slightly shorter than one period of SER_DATA_CLK. This means only the first bit of the 8-bit channel contains valid data. Similarly, at 16 and 32 kbps data rate, the CHANNEL_ENABLE pulse width is almost twice and quadruple that of SER_DATA_CLK, respectively. And only the first two and four bit of the 8-bit channel contains valid data. It is apparent to those skilled in the art that CHANNEL_ENABLE may be any duration greater than or equal to one bit length. The other input to element 203 is a serial data clock as shown in FIGS. 3 and 4. Element 203 generates SHIFT_CLK that goes to counter 207 and the external serial-to-parallel shift register.

With reference to FIG. 3, a detailed description of the timing will be discussed. In this example, the 192 KHz SER_DATA_CLK clock, the 8 KHz CHANNEL_ENABLE, and the 192 kbps serial data are generated by an external device such as the Digital Subscriber Controller. The 192 KHz serial channel is sub-divided into three time slots: Bd, Be and Bf. Note: channel Bd is used for this example. Serial data is transmitted and received on the falling and rising edges of SER_DATA_CLK, respectively. With further reference to FIG. 4, the 64 KHz Bd channel can be further sub-divided into four sub-rates: 8, 16, 32, and 64 kbps. This is achieved by the external programmable control signal CHANNEL_ENABLE described earlier. Again, at the 8 kbps data rate, only one SHIFT_CLK is generated at the beginning of Bd channel. At the maximum data rate of 64 kbps, eight SHIFT_CLK pulses are generated.

With renewed reference to FIG. 5, two cases of timing are illustrated over three Bd channel times. The data rate for case 1 and case 2 is 64 kbps and 32 kbps, respectively. For case 1, the IN_FRAME signal changes to a logic one within the Bd channel, and LOAD_IN_FIFO is generated on the next SHIFT_CLK. Subsequent LOAD_IN_FIFO pulses are generated once every eight SHIFT_CLK cycles, loading 8-bit parallel data into the FIFO. For case 2, the IN_FRAME signal changes to a logic one on the last bit of Bd channel, the signal LOAD_IN_FIFO is generated at the beginning of the next Bd channel.

Some possible modifications and additions will be presented at this time. If the number of bits of the frame sync pattern is other than 8-bit as shown in the present invention, the input to element 207 may be appropriately changed to the correct value. Another modification is to tie the preset input of element 208 to an externally controlled signal. This allows the circuit to operate in two possible options: (1) when the control is set to logic one, the circuit functions as explained, (2) when the control is set to logic zero, the IN_FRAME signal is forced to logic one, and the circuit becomes a free running divide-by-eight clock generator. The later option is normally used in a synchronous store and forward devices, where serial data is converted to parallel data and temporarily stored before being re-transmitted.

If the CHANNEL_ENABLE is tied to a logic one, then the serial-in data stream is of continuous type. This may apply to some applications where the serial-in data is not channelized as in the present invention. This circuit will work with TDM systems of greater or lesser channel numbers, only the external signals provided to this circuit need to be modified to indicate the individual bit rate and the valid channel time.

These possible modifications illustrate that the circuit may be adapted and applied to many types of serial data streams, by supplying proper timing to these control signals.

In summary, the present invention presents a single circuit that performs dual functions. The circuit may be enabled (restarted) or disable under external control. It may be tailored to many types of continuous or discontinuous serial data stream, with or without frame synchronization pattern.

Although the preferred embodiment of the invention has been illustrated, and that form described, it will be readily apparent to those skilled in the art that various modifications may be made therein without departing from the spirit of the invention or from the scope of the appended claims.

What is claimed is:

1. A single circuit for detecting a synchronization pattern in a serial data stream, subsequent to detecting said synchronization pattern, said single circuit generates a plurality of signals, said plurality of signals includes a SHIFT_CLOCK signal for shifting data from said serial data stream in into a serial-to-parallel converter, an IN_FRAME signal for signalling that said single circuit detected said synchronization pattern, and LOAD signal for transferring data from said serial-to-parallel converter to a memory means, said LOAD signal is generated each time said serial-to-parallel converter has captured a predetermined number of data bit from said serial data stream, said single circuit receives a reset signal, said single circuit comprising:

control means arranged to receive said serial data stream, said control means generates said SHIFT_CLOCK signal;

detector means connected to said control means, said detector means arranged to detect said synchronization pattern, subsequent to detecting said synchronization pattern said detector means generates said LOAD signal; and indicator means connected to said detector means, said indicator means arranged to generate said IN_FRAME signal after said detector means detects said synchronization pattern.

2. A single circuit as claimed in claim 1, wherein: said control means further includes a reset means arranged to receive said reset signal, upon receiving said reset signal, said reset means:

indicates to said detector means to detect said synchronization pattern; and indicates to said indicator means to inhibit generation of said IN_FRAME signal.

3. A single circuit for detecting a synchronization pattern in a serial data stream, subsequent to detecting said synchronization pattern, said single circuit generates a plurality of signals, said plurality of signals includes a SHIFT_CLOCK for shifting data from said serial data stream in into a serial-to-parallel converter, an IN_FRAME for signalling that said single circuit detected said synchronization pattern, and LOAD for transferring data from said serial-to-parallel converter to a memory means, said LOAD signal is generated each time said serial-to-parallel converter has captured a predefined number of data bit from said serial data stream, said single circuit receives a reset signal and an enable signal, said single circuit comprising:

control means arranged to receive said serial data stream, aid control means generates said SHIFT_CLOCK signal;

detector means connected to said control means, said detector means further arranged to detect said synchronization pattern, subsequent to detecting said synchronization pattern, said detector means generates a PRE_LOAD signal;

pulse generator means arranged to receive said PRE_LOAD signal from said detector means and generate said LOAD, said LOAD having a pulse of duration equal to a bit period of said serial data stream; and indicator means arranged to generate an IN_FRAME signal after said detector means detects said synchronization pattern.

4. A single circuit as claimed in claim 3, wherein: said control means further arranged to receive said reset signal, upon receiving said reset signal, said control means:

indicates to said detector means to detect said synchronization pattern; and indicates to said indicator means to inhibit generation of said IN_FRAME signal.

5. A single circuit as claimed in claim 3, wherein: said control means further arranged to receive said enable signal, in he absence of said enable signal, said control means inhibits said detector means from detecting said synchronization pattern of generating said LOAD signal.

6. A single circuit as claimed in claim 5, wherein: said control means only generates said SHIFT_CLOCK signal when said control means receives said enable signal.

7. A single circuit as claimed in claim 6, wherein: said detector means further arranged to receive said shift clock signal;

when said detector means is detecting said synchronization pattern and said synchronization pattern is being received, said detector means is incremented by said shift clock signal, absent said synchronization pattern being received, said detector means is reset to a predetermined starting point; and when said detector means is generating said LOAD signal, said detector means divides said SHIFT_CLOCK signal by a predetermined number to create said LOAD signal.

8. A single circuit for detecting a synchronization pattern in a serial data stream, subsequent to detecting said synchronization pattern, said single circuit generates a plurality of signals, said plurality of signals includes a SHIFT_CLOCK for shifting data from said serial data stream in into a serial-to-parallel converter, an IN_FRAME for signalling that said single circuit detected said synchronization pattern, and LOAD for transferring data from said serial-to-parallel converter to a memory means, said LOAD signal is generated each time said serial-to-parallel converter has captured a predefined number of data bit from said serial data stream, said single circuit receives a reset signal and an enable signal, said single circuit comprising:

control means arranged to receive said serial data stream, said control means generates said SHIFT_CLOCK signal;

detector means connected to said control means, said detector means arranged to detect said synchronization pattern, when said detector means is detecting said synchronization pattern and said synchronization pattern is being received, said detector means is incremented by said SHIFT_CLOCK signal, absent said synchronization pattern being received, said detector means is reset to a predetermined starting point, said detector means detects said synchronization pattern when said detector means has been incremented by a predetermined number without being reset, subsequent to detecting said synchronization pattern said detector means is converted into a counter means, said counter means, after counting a predetermined number of bits in said serial data stream, generates said LOAD signal; and indicator means connected to said detector means, said indicator means arranged to generate said IN_FRAME signal after said detector means detects said synchronization pattern.

9. A single circuit as claimed in claim 8, wherein: said control means further arranged to receive said reset signal, upon receiving said reset signal, said control means;

indicates to said detector means to detect said synchronization pattern; and indicates to said indicator means to inhibit generation of said IN_FRAME signal.

10. A single circuit as claimed in claim 8, wherein: said control means further arranged to receive said enable signal, in the absence of said enable signal, said control means inhibits said detector means from detecting said synchronization pattern or generating said LOAD signal.

11. A single circuit as claimed in claim 10, wherein: said control means only generates said SHIFT_CLOCK signal when said control means receives said enable signal.

* * * * *